United States Patent [19]

Bellows et al.

[11] Patent Number: 4,818,642

[45] Date of Patent: Apr. 4, 1989

[54] ELECTROLYTE ADDITIVE FOR IMPROVED BATTERY PERFORMANCE

[75] Inventors: Richard J. Bellows, Hampton; Edward Kantner, E. Brunswick, both of N.J.

[73] Assignee: Exxon Research and Engineering Company, Florham Park, N.J.

[21] Appl. No.: 835,339

[22] Filed: Mar. 3, 1986

[51] Int. Cl.[4] .......................................... H01M 10/26
[52] U.S. Cl. ............................... 429/105; 429/248; 429/46; 429/12; 429/198; 429/199
[58] Field of Search ............... 429/248, 105, 101, 46, 429/42, 12, 199, 198

[56] References Cited

U.S. PATENT DOCUMENTS 4,074,028  2/1978  Will ..................................... 429/105
4,105,829  8/1978  Venero ................................ 429/15

OTHER PUBLICATIONS

Kirk—Othmer "Encyclopedia of Chemical Technology", 3rd Edition, vol. 22, pp. 350–351, New York 1978.

Primary Examiner—John F. Niebling
Assistant Examiner—Steven P. Marquis
Attorney, Agent, or Firm—Joseph J. Dvorak

[57] ABSTRACT

In one embodiment of the present invention, there is provided an electrochemical cell having a metal bromine couple. The cell includes an electrode structure on which to deposit the metal of the couple and a counterelectrode at which to generate bromine. A microporous membrane separates the electrode and counterelectrode. Importantly, the aqueous electrolyte comprises an aqueous metal bromide solution containing a water soluble bromine complexing agent capable of forming a water immiscible complex with bromine and an additive capable of decreasing the wettability of the microporous separators employed in such cells by such water immiscible bromine complexes.

10 Claims, 1 Drawing Sheet

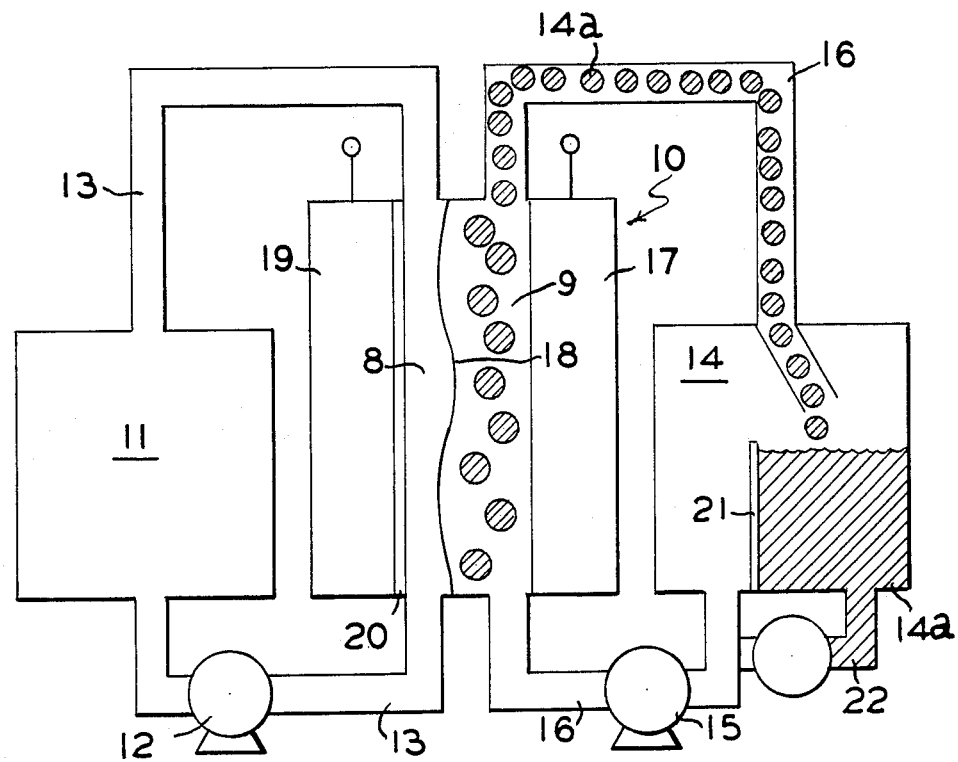

ELECTROLYTE ADDITIVE FOR IMPROVED BATTERY PERFORMANCE

The Government of the United States of America has rights in this invention pursuant to Contract Agreement No. 26-6578 entered into with Sandia National Laboratories on behalf of the U.S. Department of Energy.

BACKGROUND OF THE INVENTION

1. Field of the Invention

This invention relates to secondary batteries employing microporous separators and having as the electrolyte an aqueous metal bromide solution containing a complexing constituent capable of forming a water immiscible complex with cathodic bromine.

2. Prior Art

As is well known in the art, electrochemical cells have been proposed which have one electrode with a high positive oxidizing potential and another electrode with a strong negative or reducing potential. Typical of such cells is the metal halogen cell in which the anode material typically is zinc or cadmium and the cathodic halogen typically is bromine. Among the advantages of such metal halogen cells is their extremely high theoretical energy density. For example, a zinc bromine cell has a theoretical energy density of 200 Wh/lb., i.e., watt hours per pound, and an electric potential of about 1.8 volts per cell.

Electrochemical cells of the foregoing type are known to suffer from a number of disadvantages. Most of these disadvantages are associated with side reactions which may occur in such cells. For example, during the charging process free bromine is generated in the cell. This free bromine is available for electrochemical reaction with the zinc anode thereby resulting in auto discharge of the cell.

In U.S. Pat. No. 4,105,829 there is disclosed a metal halogen cell which employs a circulating electrolyte system containing complexing agent to effectively remove cathodic halogen from the electrolyte during charging of the cell. Basically, the complexing constituent or complexing agent is one which in the presence of halogen forms a water immiscible halogen complex. This complex is separated and stored external the cell during charging and is returned to the cell during discharge.

Another typical feature of the metal halogen cell disclosed in the aforementioned patent is that a microporous separator is employed. Among other things, the microporous separator serves to prevent contact of the metal anode with the counterelectrode in the cell, and it reduces contact of the metal anode with cathodic halogen during charging of the cell.

Despite the significant improvement that is achieved with the aqueous zinc bromine battery disclosed in the aforementioned patent, coulombic inefficiencies still result in operating such cells since the amount of energy recovered from the cell is less than that which is put in during charging of the cell.

SUMMARY OF THE INVENTION

It has now been discovered that the coulombic efficiency of such cells can be increased if an additive which is capable of decreasing the wettability of the microporous membrane separator in the cell by the water immiscible halogen complex, is added to the electrolyte. Thus, in one embodiment of the present invention, there is provided an electrochemical cell having a metal bromine couple. The cell includes an electrode structure on which to deposit the metal of the couple and a counterelectrode at which to generate bromine. A microporous membrane separates the electrode and counterelectrode. Importantly, the aqueous electrolyte comprises an aqueous metal bromide solution containing a water soluble bromine complexing agent capable of forming a water immiscible complex with bromine and an additive capable of decreasing the wettability of the microporous separators employed in such cells by such water immiscible bromine complexes.

BRIEF DESCRIPTION OF THE DRAWINGS

The sole FIGURE is schematic diagram of a typical circulating zinc bromine electrochemical cell which can benefit from the use of the additive of the present invention.

DETAILED DESCRIPTION OF THE INVENTION

In the description which follows, for convenience, the metal of the metal halogen couple will be referred to as the anode and the halogen as the cathode. It will be appreciated, however, that the metal halogen cell is a secondary cell and consequently the halogen acts as a cathode on discharge and as an anode on charging. Similarly, the metal of the couple acts as an anode on discharge of the cell and as a cathode on its charging.

Referring now to the FIGURE, a schematic diagram of a typical circulating bipolar metal bromine electrochemical cell 10 is shown. The zinc bromine electrochemical cell comprises two electrolytes (an anolyte and a catholyte) which are circulated through separate compartments 8 and 9, respectively. In cell 10, the anolyte is stored in reservoir 11 and circulated via pump 12 through compartment 8 and loop 13 which is generally referred to as the anolyte loop. A catholyte, which generally is stored in reservoir 14 is circulated by pump 15 through compartment 9 and loop 16 and it is generally referred to as the catholyte loop.

A microporous separator 18 delineates and defines the boundary between the anode and cathode compartments 8 and 9, respectively. Separator 18 is a membrane which prevents or hinders movements of anions, e.g., bromide and polybromide ions including tribromide, pentabromide and heptabromide ions, from the cathode compartment 9 to the anode compartment 8. Such membranes are well known and are commercially available. Typical membranes include separator materials sold under the name Daramic by W. R. Grace and Co., Baltimore, Md, Submicro, sold by Evans Products Co., New York, N.Y., and Hipore, sold by Asahi Chemicals, Tokyo, Japan, each of which comprise a porous silica phase imbedded in a polyolefin binder.

In a bipolar cell design, the electrode structure 19 for the deposition of the metal of the couple, for example, zinc, and the electrode structure 17 for the generation of bromine are on opposite sides of the same electrode structure.

The electrolyte of the present invention is an aqueous solution of a metal bromide, the metal of the metal bromide being the same metal as that of the anode. Indeed, that metal is selected from cadmium and zinc and for convenience reference hereinafter will be made only to zinc. In general, the electrolyte will contain about 1 to 6 and preferably about 3 moles of zinc bromide. The electrolyte of the present invention also includes a complexing constituent which is capable of forming a water immiscible complex in the presence of elemental bromine.

Suitable complexing constituents for use in the electrolyte of the present invention are set forth in U.S. Pat. No. 4,105,829 which is incorporated herein by reference. Among the preferred complexing constituents in the practice of the present invention are N-methyl, N-ethyl morphollium bromide, N-methyl, N-ethyl pyrollidinium bromide and N-methyl, N-ethyl piperidinium bromide and mixtures thereof.

It is a significant feature of the present invention that the electrolyte contain an additive which is capable of decreasing the wettability of the microporous separator by the water immiscible bromine complex that forms during charging of the cell. In general, the additive will be a surfactant; however, not all surfactants will produce the desired result. Screening of suitable additives is conducted very simply by vertically suspending a separator in a clear vessel which contains aqueous electrolyte including the test additive and a water immiscible bromine complex of the type to be formed in the cell under conditions of use. If the test additive inhibits the wetting of the separator, the bromine complex will not wick-up the separator but will remain at substantially the same level in the vessel. Among suitable surfactants that are capable of decreasing the wettability of microporous battery separators by water immiscible bromine complexes are sodium dodecylsulfate and sodium dodecylbenzene sulfonate.

Also, it has been found that use of such additives, even in relatively small amounts, increases the coulombic efficiency of cells employing such additives whereas when no such additive is used and the separator is wet by the bromine complex the coulombic inefficiency of the cell increases. In general, the amount of surfactant employed should be sufficient to provide a measurable increase in the coulombic efficiency of the cell, and preferably will be in the range of about 0.01 wt. % to about 0.3 wt. %.

Referring again to the FIGURE, in operation anolyte and catholyte are circulated through the cell 10 by means of pump 12 or 15, respectively. At least the catholyte has the composition described in accordance with the present invention; however, for convenience, both the anolyte and catholyte have the same composition prior to charging the cell. An electrode potential is applied to the cell resulting in deposition of zinc shown as layer 20 on electrode 19. Bromine also is generated. The bromine which is generated at the chemically inert electrode structure 17 reacts with complexing agent in the electrolyte to form a substantially water immiscible complex 14a. Since the bromine rich complex 14a is heavier than water, it tends to settle on the bottom of tank 14 and is therefore not recirculated, at least in any substantial amount through the cell during charging. Indeed, the baffle 21 in the holding tank 14 helps with the separation of the bromine containing aqueous soluble complex. Consequently, substantially only an aqueous phase is recirculated through the cell during the charging period. On discharging, however, the complex is flowed back to the cathode by first emulsifying and dispersing it in the aqueous phase. This can be accomplished by mixing means (not shown). For example, a high shear or ultrasonic mixing device can be incorporated within the gravity separated tank. In such case, activation of the mixing mechanism will be initiated prior to discharge of the cell. Optionally pipe means 22 as shown can be used for drawing substantially the water immiscible complex 14a from the bottom of the separator tank. In any event, the bromine phase will be distributed as an emulsion in the aqueous phase and recirculated through the electrolyte chamber during cell discharge.

To illustrate the improved coulombic efficiency obtained in accordance with the present invention, reference is made to the following example.

EXAMPLE

An eight-cell bipolar battery was assembled with 1200 cm$^2$ bipolar electrodes and microporous separators comprising a porous silica phase embedded in a polyolefin binder and sold under the trademark "Daramic". To the battery, 81 of electrolyte was added, and the battery system was placed on a cycle testing routine. The routine consisted of a 3-hr, 24 A charging and a 24 A discharging to an 8 V (1 V/cell) cutoff. The ratio of discharge time to charge time was a measure of coulombic efficiency. This test procedure was carried out with both electrolytes A and B, the composition of which are given in Table I below.

TABLE I

| Electrolyte | Composition |
| --- | --- |
| A | 3 M ZnBr$_2$ |
| | 0.5 M N—methyl, N—ethyl morpholinium bromide |
| | 0.5 M N—methyl, N—ethyl pyrollidinium bromide |
| B | 2 M ZnBr$_2$ |
| | 1 M ZnCl$_2$ |
| | 0.5 M N—methyl, N—ethyl morpholinium bromide |
| | 0.5 M N—methyl, N—ethyl pyrollidinium bromide |

Also, after establishing the coulombic efficiency of the battery with each electrolyte, sodium dodecyl sulfate was added to the electrolyte (anolyte and catholyte) when the battery was discharged. Sodium dodecyl sulfate was selected since its presence decreased the wettability of the microporous separator by the bromine complex generated during charging of the cell. The electrolyte was circulated for 2 to 16 hrs to evenly distribute the sodium dodecyl sulfate. Then the charge/discharge regimen was repeated. The results are set forth in Table II below.

TABLE II

| Run | Electrolyte | Sodium Dodecyl Sulfate, wt % | Coulombic Efficiency, % |
| --- | --- | --- | --- |
| 1 | A | None | 71 |
| 2 | A | .01 | 80 |
| 3 | A | .03 | 81.5 |
| 4 | A | .1 | 84 |
| 5 | B | None | 80 |
| 6 | B | .1 | 90 |

What is claimed is:
1. An electrochemical cell having a metal bromine couple, said cell comprising:
an electrode structure on which the metal of the couple is deposited during charging of the cell;
a counterelectrode structure at which to generate cathodic bromine during charging of the cell;
a microporous separator between said electrode and counterelectrode structure;

an aqueous electrolyte of a metal bromide, the metal of the bromide being the same as the metal of the couple and including a water soluble complexing agent capable of forming a water immiscible complex with bromine; and an additive capable of decreasing the wettability of the microporous separator by the immiscible bromine complex formed during charging of the cell, said additive being present in amount sufficient to produce a measurable increase in the coulombic efficiency of said cell.

2. The cell of claim 1 wherein said metal bromide is selected from zinc and cadmium bromide.

3. The cell of claim 2 wherein said metal is zinc.

4. The cell of claim 2 wherein said additive is selected from sodium dodecyl sulfate and sodium dodecylbenzene sulfonate.

5. The cell of claim 4 wherein said additive is present in from about 0.01 wt. % to about 0.3 wt. %.

6. The cell of claim 5 wherein said additive is sodium dodecyl sulfate.

7. The cell of claim 5 wherein said additive is sodium dodecylbenzene sulfonate.

8. A method of enhancing coulombic efficiency of electrochemical zinc or cadmium bromine cells having microporous separators and employing aqueous zinc bromide or cadmium bromide electrolyte and a water soluble complexing agent capable of forming a water immiscible complex with bromine, said method comprising adding an additive to said electrolyte which is capable of decreasing the wettability of said microporous separator by said water immiscible bromine complex wherein the coulombic efficiency of said cell is increased.

9. The method of claim 8 wherein said additive is selected from sodium dodecylsulfate and sodium dodecylbenzene sulfonate.

10. The method of claim 9 wherein said additive is present in amounts ranging from about 0.01 wt. % to about 0.1 wt. %.

* * * * *